(12) United States Patent
Tsuruoka

(10) Patent No.: US 9,544,450 B2
(45) Date of Patent: Jan. 10, 2017

(54) IMAGE FORMING APPARATUS AND METHOD FOR UPDATING FIRMWARE

(71) Applicant: Naoto Tsuruoka, Kanagawa (JP)

(72) Inventor: Naoto Tsuruoka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/709,393

(22) Filed: May 11, 2015

(65) Prior Publication Data

US 2015/0334262 A1 Nov. 19, 2015

(30) Foreign Application Priority Data

May 14, 2014 (JP) .................................. 2014-100707

(51) Int. Cl.
*G06F 3/12* (2006.01)
*H04N 1/00* (2006.01)

(52) U.S. Cl.
CPC ........ *H04N 1/00204* (2013.01); *H04N 1/0097* (2013.01); *H04N 1/00938* (2013.01); *H04N 1/00973* (2013.01); *H04N 2201/0094* (2013.01)

(58) Field of Classification Search
None
See application file for complete search history.

(56) References Cited

U.S. PATENT DOCUMENTS

| 9,164,757 B2* | 10/2015 | Han ........................ G06F 8/665 |
| 2003/0063305 A1* | 4/2003 | McIntyre ............... G06K 15/00 358/1.13 |
| 2008/0127159 A1* | 5/2008 | Regenmorter ............ G06F 8/65 717/168 |
| 2008/0259398 A1* | 10/2008 | Osuka .................... B41J 3/4075 358/1.15 |
| 2008/0288936 A1* | 11/2008 | Ikeda ........................ G06F 8/65 717/173 |
| 2010/0309510 A1* | 12/2010 | Hansen .................. G06F 3/1203 358/1.15 |
| 2010/0315670 A1* | 12/2010 | Kojima .................. G06F 3/1204 358/1.15 |
| 2012/0297375 A1* | 11/2012 | Burke, Jr. .................. G06F 8/65 717/173 |
| 2013/0086574 A1* | 4/2013 | Yada ........................ G06F 8/65 717/173 |
| 2014/0068597 A1* | 3/2014 | Hirahara .................... G06F 8/65 717/173 |

(Continued)

FOREIGN PATENT DOCUMENTS

| JP | 2000-298580 | 10/2000 |
| JP | 2002-222068 | 8/2002 |

*Primary Examiner* — Miya J Cato
(74) *Attorney, Agent, or Firm* — Duft Bornsen & Fettig LLP

(57) ABSTRACT

An image forming apparatus capable of receiving firmware from an information processing apparatus via a network, includes a storage unit storing the firmware received from the information processing apparatus; a search for unit searching for one or more other image forming apparatuses on the network which are a same model of the image forming apparatus whose firmware can be updated to the firmware stored in the storage unit; and an update execution unit updating firmware of the one or more other image forming apparatuses that are searched for by the search for unit.

9 Claims, 8 Drawing Sheets

(56) References Cited

U.S. PATENT DOCUMENTS

2014/0123123 A1\* 5/2014 Bahls ..................... G06F 8/71
717/170
2015/0347118 A1\* 12/2015 Yeung ..................... G06F 8/65
717/172

\* cited by examiner

FIG.5A

```xml
XML
- <GROUP NAME="INTERFACE">
  - <!-- INTERFACE -->
  - <ITEM NAME="INTERFACE" TYPE="CFG_UCHAR">
      <VAL>1</VAL>
      <DEFVAL>1</DEFVAL>
    - <DSP SHOW="YES" PROTECT="NO">
        <TX LA="EN">INTERFACE</TX>
        <TX LA="JA">INTERFACE</TX>
      - <INPUT TYPE="RADIO">
        - <CL>
          - <CI VAL="1">
              <TX LA="EN">Telnet5250</TX>
              <TX LA="JA">Telnet5250</TX>
            </CI>
            ......
            ......
          </CL>
        </INPUT>
      </DSP>
    </ITEM>
```

FIG.5B

| FUNCTION SETTING INFORMATION | | | APPARATUS INFORMATION | | | | STATE INFORMATION | | | |
|---|---|---|---|---|---|---|---|---|---|---|
| DEFAULT SHEET SIZE | COLOR PRINTING | ... | IP ADDRESS | FIRMWARE VERSION | ... | ... | POWER SUPPLY STATE | PROCESSING STATE | ... | ... |
| A4 | YES | ... | 192.168.xxx.xxx | Ver1.0.0 | ... | ... | OPERATING STATE | PRINT EXECUTING | ... | ... |

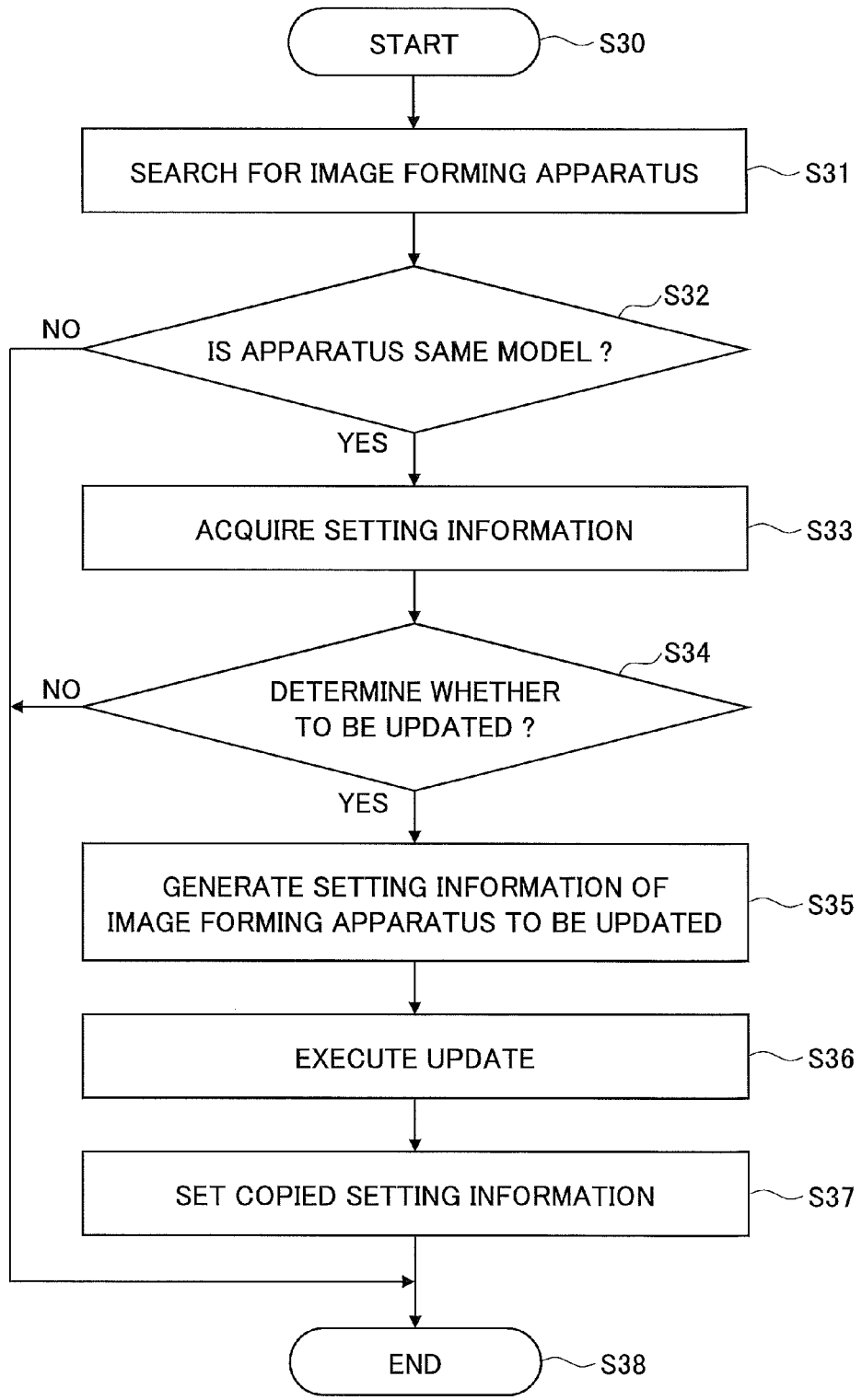

IMAGE FORMING APPARATUS AND METHOD FOR UPDATING FIRMWARE

CROSS-REFERENCE TO RELATED APPLICATIONS

The present application is based on and claims the benefit of priority under 35 U.S.C. §119 of Japanese Patent Application No. 2014-100707 filed May 14, 2014, the entire contents of which are hereby incorporated herein by reference.

BACKGROUND OF THE INVENTION

1. Field of the Invention

The present invention generally relates to an image forming apparatus, an image forming method, and a recording medium 2. Description of the Related Art In order to update the firmware versions of image forming apparatuses, it is necessary for an operator to separately and manually update the versions of the image forming apparatuses. To resolve the inconvenience, there is a known technique in which a server sends a firmware update request to image forming apparatuses, so as to update the firmware versions of the image forming apparatus.

For example, there is a known method in which a server manages the firmware versions of the image forming apparatus, and the server performs the update of the firmware versions on the registered (managed) image forming apparatuses (see, for example, Japanese Laid-open Patent Publication No. 2000-298580).

SUMMARY OF THE INVENTION

According to an aspect of the present invention, an image forming apparatus capable of receiving firmware from an information processing apparatus via a network, includes a storage unit storing the firmware received from the information processing apparatus; a search for unit searching for one or more other image forming apparatuses on the network which are a same model as the image forming apparatus whose firmware can be updated to the firmware stored in the storage unit; and an update execution unit updating firmware of the one or more other image forming apparatuses that are searched for by the search for unit.

BRIEF DESCRIPTION OF THE DRAWINGS

Other objects, features, and advantages of the present invention will become more apparent from the following description when read in conjunction with the accompanying drawings, in which:

FIGS. 5A and 5B illustrate an example data configuration of setting information stored in a setting information storage section according to an embodiment;

FIG. 8 is a flowchart of an execution procedure of upgrading the firmware (firmware version) of another image forming apparatus 2 according to an embodiment.

DETAILED DESCRIPTION OF THE PREFERRED EMBODIMENTS

In related technologies, it is possible to automatically update firmware versions. However, in order to update the firmware versions of the image forming apparatus, it is necessary to register the apparatus information of all the image forming apparatuses one by one in advance, which is still cumbersome for an operator.

The present invention is made in light of the problem, and may provide an image forming apparatus, an image forming method, and an image forming program capable of upgrading the firmware (firmware version) of the image forming apparatus without cumbersome operations.

According to an embodiment of the present invention, it becomes possible to update a firmware version of an image forming apparatus without cumbersome operations.

Figure 1:
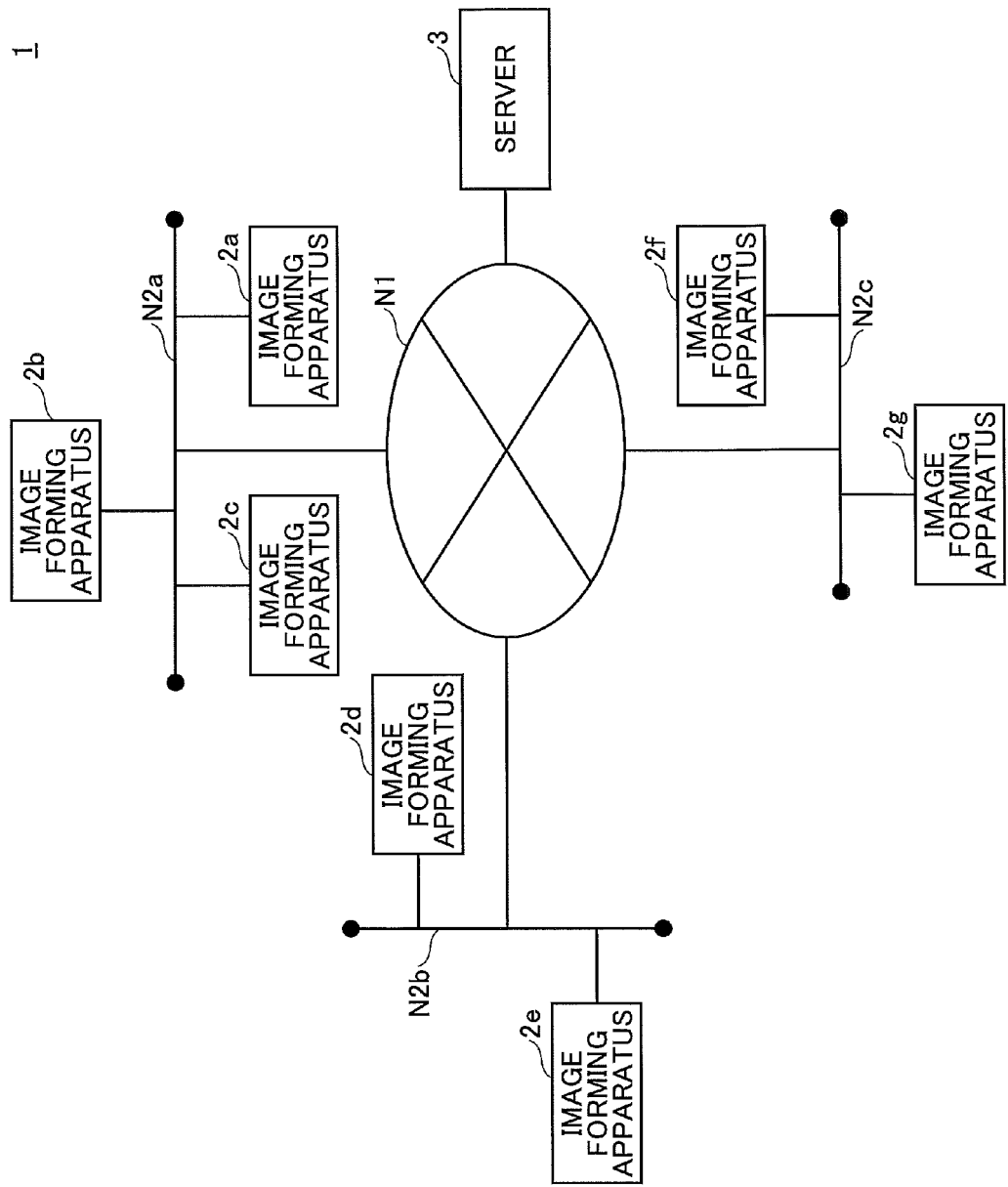
FIG. 1 illustrates an example system configuration of an image forming system according an embodiment.

In the following, preferred embodiments of the present inventions are described.
System Configuration FIG. 1 illustrates an example system configuration of an image forming system 1 according to an embodiment. The image forming system 1 includes image forming apparatuses 2a, 2b, 2c, 2d and the like (which is herein collectively called an "image forming apparatus(es) 2" when they are not distinguished from each other) and a server 3. The server 3 is on a network N1. Further, the server 3 is connected to the image forming apparatuses 2 via the network N1 and a network N2a, N2b, N2c or the like (which is herein collectively called a "network(s) N2" when they are not distinguished from each other).

The network N2 may be, for example, a Local Area Network (LAN). For example, one image forming apparatus 2 is connected to another image forming apparatus 2 via one network N2, the network N1, and another network N2. When the network N1 and the network N2 are not distinguished from each other, the term "network N" is herein used.

The image forming apparatus 2 receives an execution request to execute a function such as a print request to execute printing from a Personal Computer (PC) or the server 3, and executes the requested function. Further, the image forming apparatuses 2 can communicate with each other, so that, for example, one image forming apparatus 2 can update the firmware of another image forming apparatus 2 via the network N.

The update of the firmware is performed after an image forming apparatus(es) 2, whose firmware can be updated to the firmware of the one image forming apparatus 2, is searched for from among the image forming apparatuses 2 which are connected to the one image forming apparatus 2 via the network N. Further, the one image forming apparatus 2 determines whether the searched-for image forming apparatus(es) 2 belongs to the same network segment that the one image forming apparatus 2 belongs to.

When determining that the searched-for image forming apparatus(es) 2 belongs to the same network segment that the one image forming apparatus 2 belongs to, the one image forming apparatus 2 updates the firmware (firmware versions) of all the searched-for image forming apparatuses 2. On the other hand, when determining that that the searched-for image forming apparatus(es) 2 belongs to a network segment different from the network segment that the one image forming apparatus 2 belongs to, the one image forming apparatus 2 designates an image forming apparatus 2 whose firmware is to be updated, and updates the firmware of the designated image forming apparatus 2.

When the update is completed, the image forming apparatus 2 whose firmware has been updated updates the firmware of other image forming apparatuses 2 which belong to the same network segment that the image forming apparatus 2 belongs to, and searches for another image forming apparatus(es) 2 which belongs to another network segment(s) so as to update the firmware of the searched-for image forming apparatus(es) 2.

The image forming apparatuses 2 may be, for example, a MultiFunction Peripheral (MFP) that has an image forming function, a communication function, etc., so as to be used as a scanner, a copier, and a printer.

The server 3 stores and manages firmware (firmware versions). Further, the server 3 transmits firmware and sends an update (upgrade) request to update (upgrade) firmware to the image forming apparatus 2. The transmission of the firmware and the request of the update are performed by sending the update request from the server 3 to the image forming apparatus 2 or by receiving an update confirmation of the firmware from the image forming apparatus 2. The server 3 may be, for example, a PC, etc.

Hardware Configuration

Figure 2:
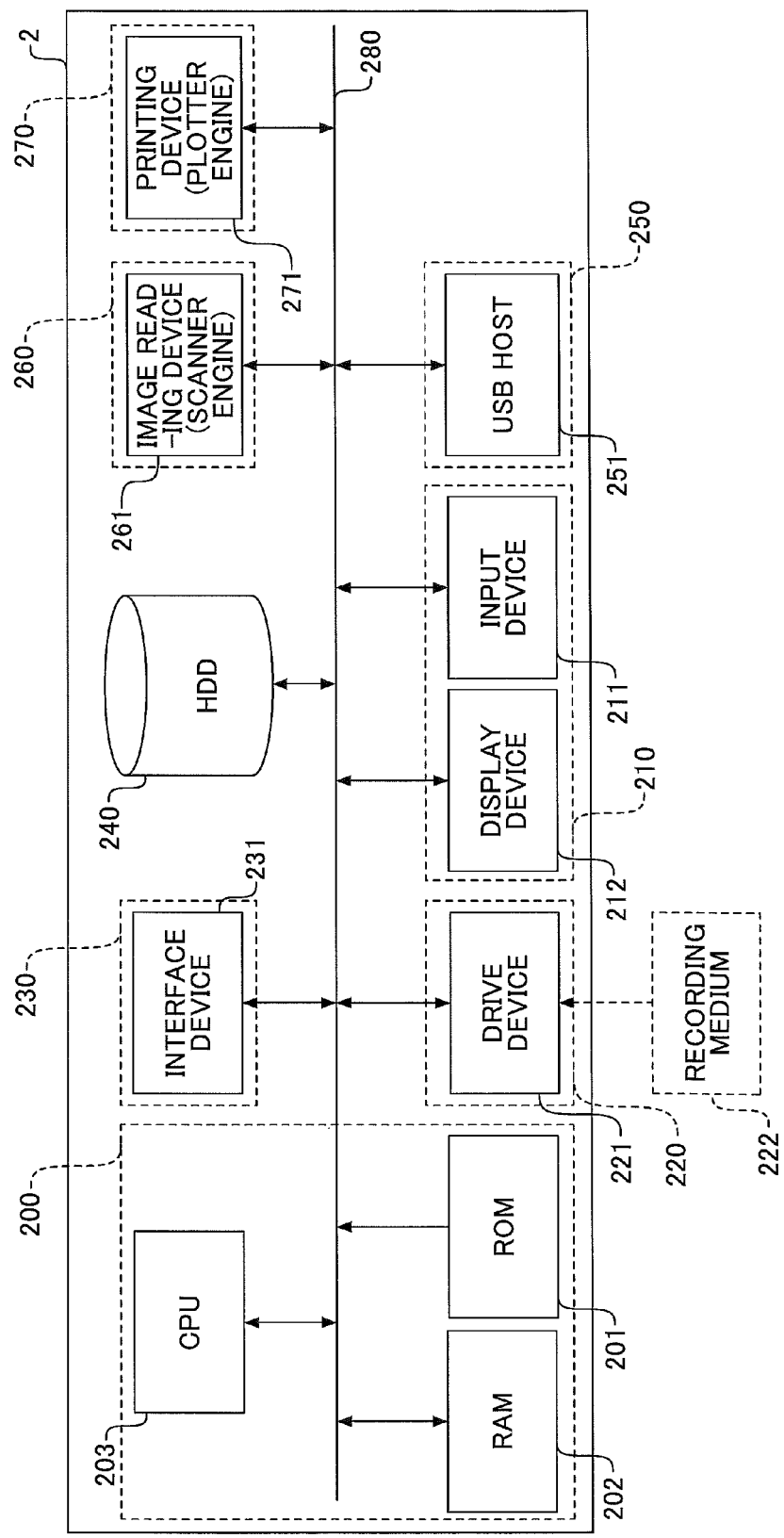
FIG. 2 illustrates an example hardware configuration of an image forming apparatus according to an embodiment.

FIG. 2 illustrates an example hardware configuration of the image forming apparatus 2 according to an embodiment.

The image forming apparatus 2 includes a controller 200, an operation panel 210, a storage medium interface (I/F) 220, a data communication I/F 230, a Hard Disk Drive (HDD) 240, a Universal Serial Bus (USB) I/F 250, a scanner 260, and a plotter 270, which are connected to each other via a Peripheral Component Interconnect (PCI) bus 280.

The controller 200 includes a Read-Only Memory (ROM) 201, a Random Access Memory (RAM) 202, and a Central Processing Unit (CPU) 203. The ROM 201 stores a program to be executed when the image forming apparatus 2 is started up and various data. The RAM 202 temporarily stores various programs and data read from the ROM 201 and the HDD 240.

The operation panel 210 includes an input device 211 and a display device 212. The input device 211 includes, for example, a keyboard, so as to be used to input various operation signals to the image forming apparatus 2. The display device 212 includes a display, so as to display various information related to image forming operations, etc.

The storage medium I/F 220 includes a drive device 221. When a recording medium 222 is set in the drive device 221, the various data recorded in the recording medium 222 are stored into the HDD 240 via the drive device 221.

The data communication I/F 230 includes an interface device 231, so that the image forming apparatus 2 can be connected to a data transmission path such as the network N.

The HDD 240 stores various data such as received document data and read image data which are handled by the image forming apparatus 2.

The USB I/F 250 includes a USB host 251, which is to be connected to various devices via a USB cable. The USB host 251 has a function to control a physical and electrical I/F so as to communicate with various devices and a function to control a USB protocol.

The scanner 260 includes an image reading device 261, so as to optically read a draft placed on a read surface and generate the image data of the draft.

The plotter 270 includes a printing device 271, so as to print a bit-map image on a recording sheet using, for example, an electrophotographic process method.

Firmware Configuration

Figure 3:
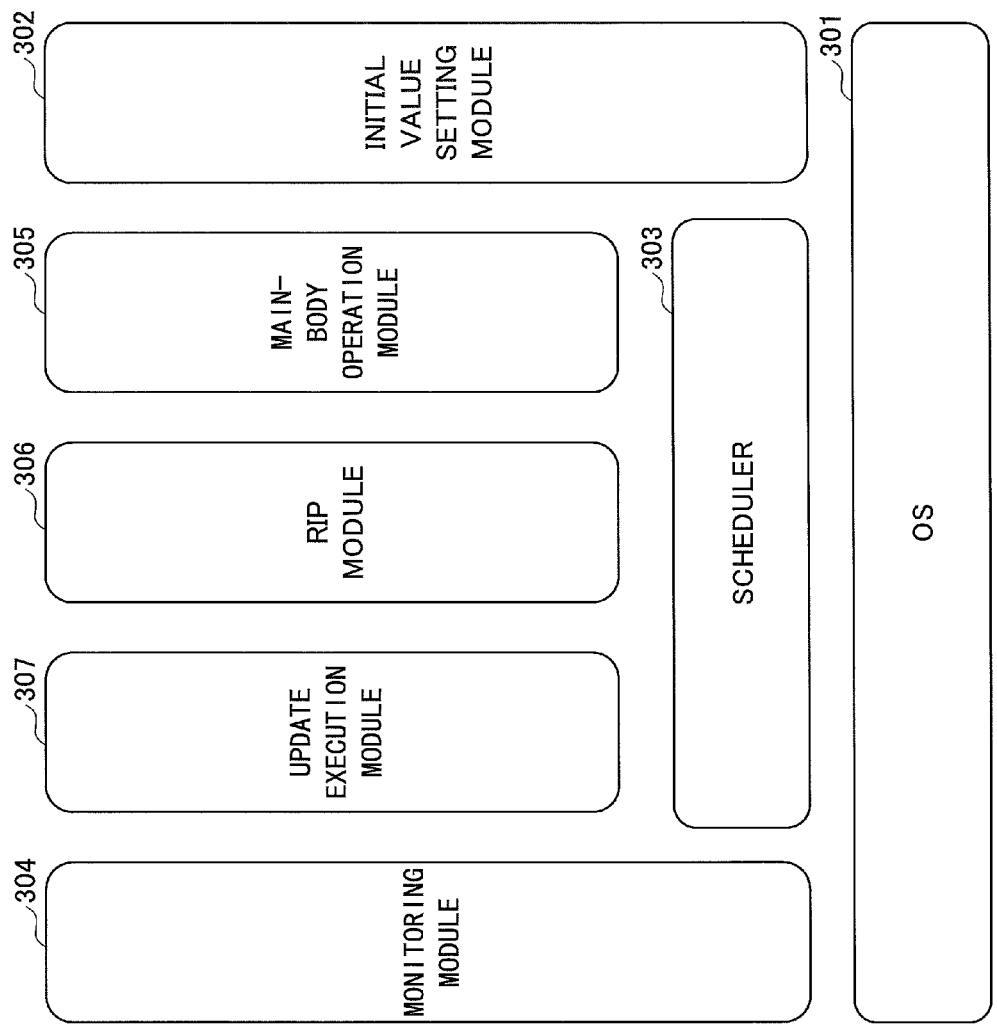
FIG. 3 illustrates an example firmware configuration of the image forming apparatus according to an embodiment.

FIG. 3 illustrates an example firmware configuration of the image forming apparatus 2 according to an embodiment. The firmware includes an Operating System (OS) 301, an initial value setting module 302, a scheduler 303, and a monitoring module 304.

The OS 301 is basic software to manage the entire image forming apparatus 2, and controls the entire operations of the image forming apparatus 2.

The initial value setting module 302 is a module to store and manage setting values necessary to operate functions of the image forming apparatus 2. The initial value setting module 302 further stores and manages firmware to be used for updating.

The scheduler 303 manages the operations of a main-body operation module 305, a Raster Image Processor (RIP) module 306, an update execution module 307, etc.

The monitoring module 304 is a module to monitor a state of the image forming apparatus 2. More specifically, the monitoring module 304 monitors a state of a power supply and an error occurrence during a process.

The main-body operation module 305 controls the display of the operation panel 210 of the image forming apparatus 2 and the input operations via the operation panel 210.

The RIP module 306 manages, for example, a print function to generate print data in a Printer Description Language (PDL) format. Here, function modules operate which are necessary when the image forming apparatus 2 executes functions on the RIP module 306.

The update execution module 307 updates the firmware of other image forming apparatus(es) 2 which is other than the own apparatus (own image forming apparatus 2). The update execution module 307 determines whether the update execution module 307 is set to be operable. Whether the update execution module 307 is set to be operable is determined based on whether the other image forming apparatus(es) 2 which is the target of the update request belongs to the same segment that the own apparatus belongs to.

Further, the selection whether the update execution module 307 is set to be activated or inactivated is managed in the same manner as the setting values of other functions managed by the initial value setting module 302.

Functional Configuration

Figure 4:
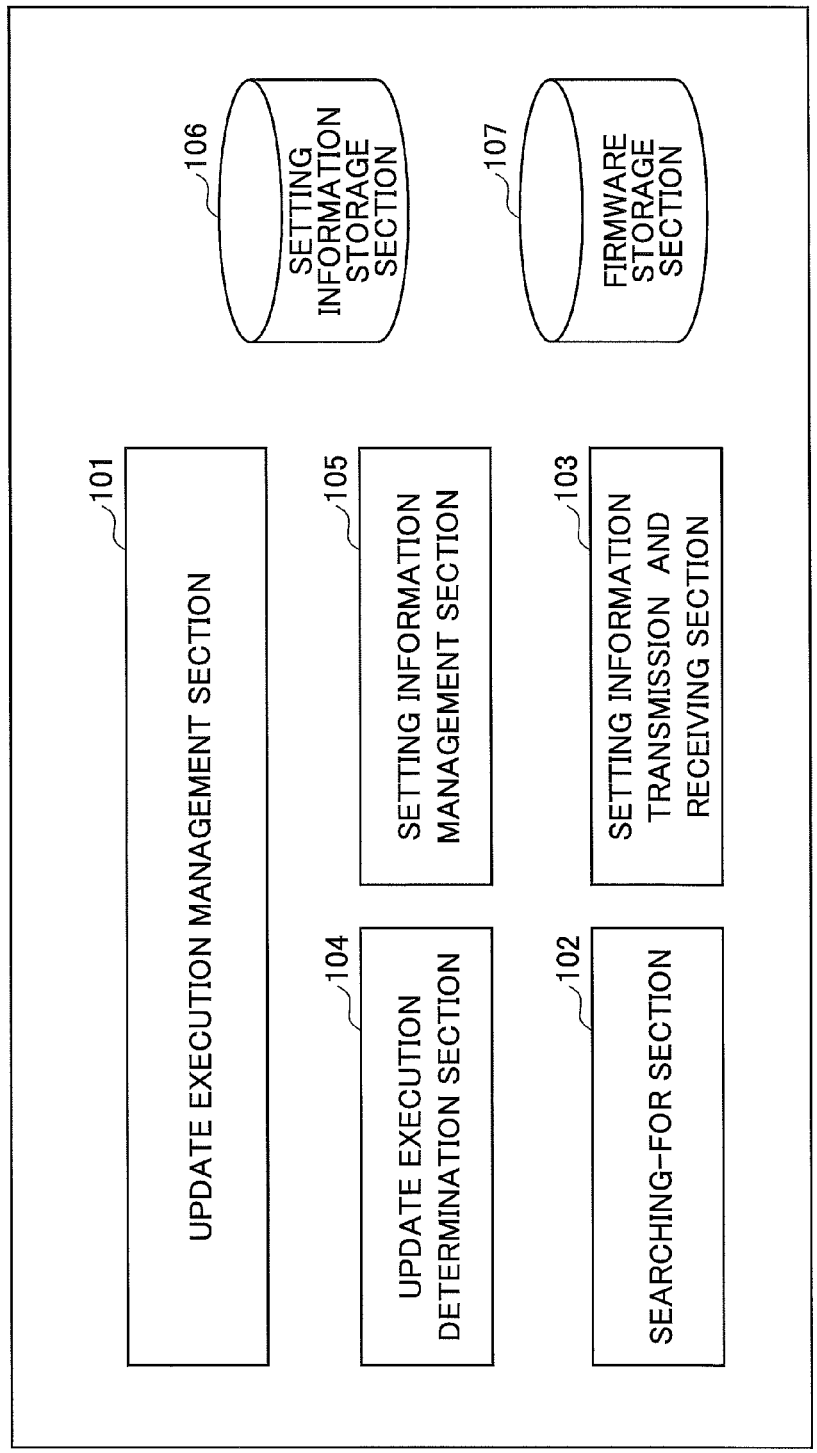
FIG. 4 illustrates an example functional configuration of the image forming apparatus according to an embodiment.

FIG. 4 illustrates an example functional configuration of the image forming apparatus 2 according to an embodiment. The image forming apparatus 2 includes an update execution management section 101, a searching-for section 102, a setting information transmission and receiving section 103, an update execution determination section 104, a setting information management section 105, a setting information storage section 106, and a firmware storage section 107. Those functional sections can be realized by executing a program in a memory by the CPU 203.

The update execution management section 101 updates the firmware (firmware versions) of the own apparatus and other image forming apparatus(es) 2. When the firmware of the own apparatus is to be updated, the update execution management section 101 starts an updating process of the firmware at the timing when an update request is received from the server 3.

Here, the image forming apparatus 2 may update the firmware (firmware version) by acquiring the firmware from the server 3, etc., which has the latest firmware. The update execution module 307 has a firmware update function for the other image forming apparatus(es) 2. When the firmware of the other image forming apparatus(es) 2 is to be updated, the update execution management section 101 switches on and off (i.e. activates and deactivates) the firmware update function of the update execution module 307 and, then, the firmware of the other image forming apparatus(es) 2 is updated.

Specifically, in a case where the other image forming apparatus(es) 2 belong to the same segment that the own apparatus belongs to, the update execution management section 101 updates the firmware of the other image forming apparatus(es) 2 in a manner such that the image forming apparatus(es) 2 has the firmware where the update execution function to update other image forming apparatus(es) 2 is switched off.

On the other hand, in a case where the other image forming apparatuses 2 belong to a segment different from the segment that the own apparatus belongs to, the update execution management section 101 designates one or more image forming apparatuses 2 whose firmware are to be updated from among the other image forming apparatuses 2 (i.e., one or more image forming apparatuses 2 belonging to the segment different from the segment that the own apparatus belongs to), so that the update execution management section 101 updates the firmware of the designated one or more image forming apparatuses 2 in a manner such that the designated one or more image forming apparatuses 2 have the firmware where the update execution function to update other image forming apparatus(es) 2 is switched on.

The searching-for section 102 searches for the image forming apparatus(es) 2 which is on the network N and is the same model of the own apparatus. In this case, the search is performed not only for the image forming apparatuses 2 belonging to the same segment as the segment to which the own apparatus belongs but also for the image forming apparatuses 2 belonging to a segment different from the segment to which the own apparatus belongs.

In this case, whether the model of the searched-for image forming apparatus 2 is the same as that of the own apparatus is determined based on, for example, the address uniquely assigned to the apparatus.

In this case, the image forming apparatus 2 stores the information, which indicates the addresses uniquely assigned to the apparatuses having the same model of the own apparatus, in a predetermined memory area, so that the searching-for section 102 determines whether the searched-for image forming apparatus 2 is the same model as the own apparatus based on the stored information.

The process of searching for the image forming apparatus 2 is performed by using a communication protocol such as a Simple Network Management Protocol (SNMP), a Simple Service Discovery Protocol (SSDP), etc.

Further, the searching-for section 102 may search for the image forming apparatus(es) 2 at the timing when, for example, the firmware update of the own apparatus is completed. Otherwise, for example, the searching-for section 102 may search for the image forming apparatus(es) 2 in a time range which is determined in advance.

The setting information transmission and receiving section 103 acquires the setting information of the image forming apparatus(es) 2 which has been determined to be the same model as the own apparatus by the searching-for section 102.

The update execution determination section 104 determines whether to perform the update of the firmware on the image forming apparatus(es) 2, whose setting information is acquired, based on the setting information acquired by the setting information transmission and receiving section 103. In this case, for example, whether to perform updating the firmware is determined based on the version of the firmware, a processing state of the image forming apparatus(es) 2, etc.

Further, the update execution determination section 104 recognizes the processing state of the image forming apparatus(es) 2 which is searched for based on the acquired setting information. For example, the update execution determination section 104 recognizes whether the searched-for image forming apparatus 2 is in an imaging process, whether an error such as running out of paper occurs in the image forming apparatus 2, etc.

Further, in a case where an error such as running out of paper which does not affect firmware update is reported to the searched-for image forming apparatus 2, the update execution determination section 104 determines that it is possible to perform firmware update on the searched-for image forming apparatus 2.

On the other hand, in a case where an error occurs which affects firmware update such as an error that cannot be corrected without turning off the power of the searched-for image forming apparatus 2, even if the searched-for image forming apparatus 2 corresponds to the image forming apparatus 2 whose firmware is to be updated, the update execution determination section 104 does not perform firmware update on the searched-for image forming apparatus 2.

Further, the update execution determination section 104 determines whether the searched-for image forming apparatus 2 belongs to the same network segment that the own apparatus belongs to based on the Internet Protocol (IP) address included in the setting information.

Then, the update execution determination section 104 notifies the update execution management section 101 of the information indicating whether it is possible to perform firmware update and whether the image forming apparatus 2 whose firmware is to be updated belongs to the same network segment.

The setting information management section 105 makes a copy of the setting information, and sets the setting information after update. Based on the configuration of the setting information of the image forming apparatus 2 which is the update source, the setting information management section 105 makes the copy of the setting information of the image forming apparatus 2 whose firmware is determined to be updated by the update execution determination section 104.

Further, in a case where the configuration of the setting information is changed by, for example adding a new items in the setting information due to the firmware update, the setting information management section 105 sets the setting information based on the setting information of the image forming apparatus 2, which is the update execution source, having the setting information corresponding to the latest firmware.

In this regard, for example, a new value, which is necessary for setting, in the item which is changed in the item configuration after update execution is copied, so that the new value is set in the corresponding part in the changed configuration. Further, a value is set in such an added item based on the setting information of the image forming apparatus 2 which is the update source.

Further, in the items which are not changed after the update execution, copied values are directly set in the same formats. By doing this, in a case where the configuration of the setting items is changed, it becomes possible for the image forming apparatus 2 to set the setting information without initializing the values in all items and re-setting values so as to correspond to the new configuration.

Further, the setting information management section 105 may set a setting value of the image forming apparatus 2 which is the update execution source, in, for example, the setting item which is added due to the firmware update.

By doing this, for example, it becomes possible to unify the setting item which is newly added among the image forming apparatuses 2 which have been updated. Namely, it becomes possible for a user to use the function which corresponds to the setting item which has been added based on the same setting after update completion.

The setting information storage section 106 stores the setting information of the image forming apparatuses 2. The setting information stored by the setting information storage section 106 is, for example, the structured data in the eXtensible Markup Language (XML) format as illustrated in FIG. 5A. Note that the setting information is not limited to the data format such as the XML format. For example, the setting information may be in a list format.

Further, as schematically illustrated in FIG. 5B, the setting information stored in the setting information storage section 106 includes, for example, various function setting information such as the print function of the image forming apparatus 2, and the apparatus information such as the firmware version and the IP address of the image forming apparatus 2. The setting information storage section 106 may further store state information indicating, for example, a power supply state and a processing state of the image forming apparatus 2.

The setting information further includes path information indicating the storage location of the firmware which is stored by the image forming apparatus 2. Based on the format of the setting information stored in the setting information storage section 106, the update execution management section 101 sets the setting information of the image forming apparatus 2 whose firmware has been updated.

The firmware storage section 107 stores the firmware which is received from the server 3 or the firmware which is received from the image forming apparatus 2 which is the update execution source. By using the firmware stored in the firmware storage section 107, the update execution management section 101 performs firmware update on the own apparatus and other image forming apparatus 2.

By having the image forming apparatus 2 which has the functions described above, it becomes possible for the image forming apparatus 2 to perform firmware update on other image forming apparatus(es) 2 which can be connected to the image forming apparatus 2 via the network N. By doing this, it becomes possible for the image forming apparatus 2 to perform firmware update without registering the image forming apparatus(es) 2 whose firmware is to be updated in the server 3.

Further, because firmware can be updated among the same model of the image forming apparatuses 2, it becomes possible to recognize, for example, an occurrence of an error in the image forming apparatus 2, so that even when an error occurs which is not serious due to, for example, running out of paper, the firmware update can be executed (continued).

Further, as described above, based on the setting information format corresponding to the latest firmware, the image forming apparatus 2 having the latest firmware of the same model sets the setting information of the image forming apparatus(es) 2 whose firmware is to be updated. Therefore, after the firmware update, it becomes possible to automatically re-set the setting information without user's manual operations.

Processing Procedure

Figure 6:
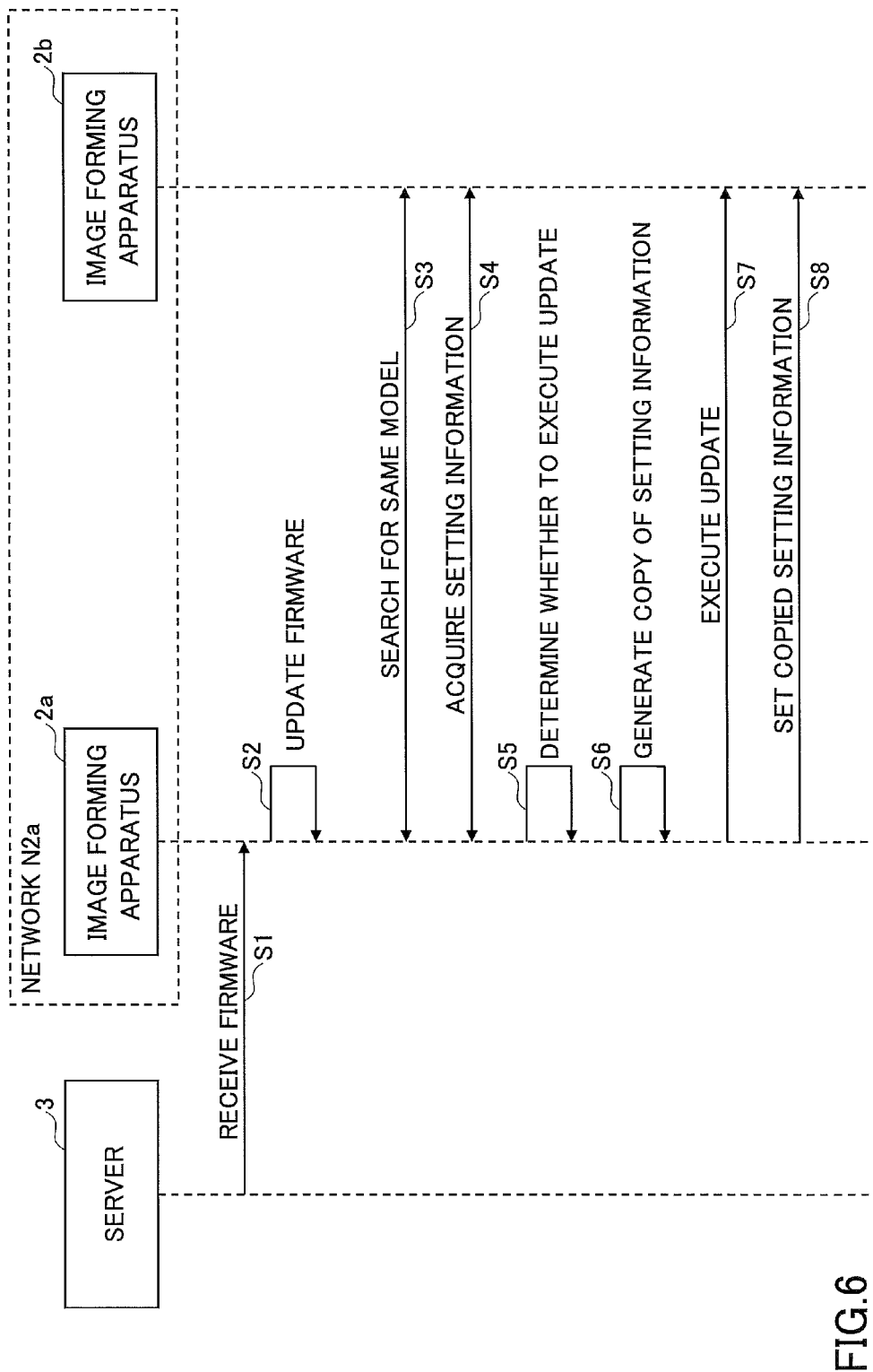
FIG. 6 is a sequence diagram of an example flow of upgrading firmware versions of image forming apparatuses on the same network segment according to an embodiment.

FIG. 6 is a sequence diagram illustrating an example process of firmware update performed on the image forming apparatuses 2 (2a, 2b) in the same segment.

The server 3 sends an update request to update firmware to the image forming apparatus 2a (step S1).

The image forming apparatus 2a, which receives the update request to update firmware from the server 3, receive the corresponding firmware, and performs firmware update of the image forming apparatus 2a (step S2). In this case, in the firmware which is used in the firmware update by the image forming apparatus 2a, the update execution module 307 is activated.

The image forming apparatus 2a searches for another image forming apparatus 2, which is the same model as the image forming apparatus 2a, on the same network N (step S3).

When the model of the searched-for image forming apparatus 2b is the same as that of the image forming apparatus 2a, the image forming apparatus 2a acquires the setting information of the searched-for image forming apparatus 2b (step S4).

Based on the acquired setting information, the image forming apparatus 2a determines whether it is necessary for the image forming apparatus 2b to update the firmware thereof (step S5).

When determining that it is necessary for the image forming apparatus 2b to update the firmware, the image forming apparatus 2a makes a copy of the setting information based on the format of the setting items of the own apparatus (image forming apparatus 2a) (step S6).

After that, the image forming apparatus 2a starts updating the firmware of the image forming apparatus 2b (step S7). In this case, in the updated firmware of the image forming apparatus 2b, the update execution module 307 is deactivated.

Namely, the firmware of the image forming apparatus 2b is updated to the firmware that cannot update the firmware of any other image forming apparatus 2.

After the update is completed, based on the copied setting information, the image forming apparatus 2a sets the setting information of the image forming apparatus 2b (step S8). The image forming apparatus 2a performs the updating process described above on the image forming apparatus(es) 2 which belong to the same network segment that the image forming apparatus 2a belongs to and whose firmware can be updated.

By performing the above process, it become possible for the image forming apparatus 2 which performs the firmware update based on the firmware received from the server 3 to update the firmware of the other image forming apparatus(es) 2 in the same network segment.

By doing this, it becomes possible to limit the number of the image forming apparatuses 2 that access the server 3 which is located outside the network segment, thereby enabling reducing the workload of the network N.

Figure 7:
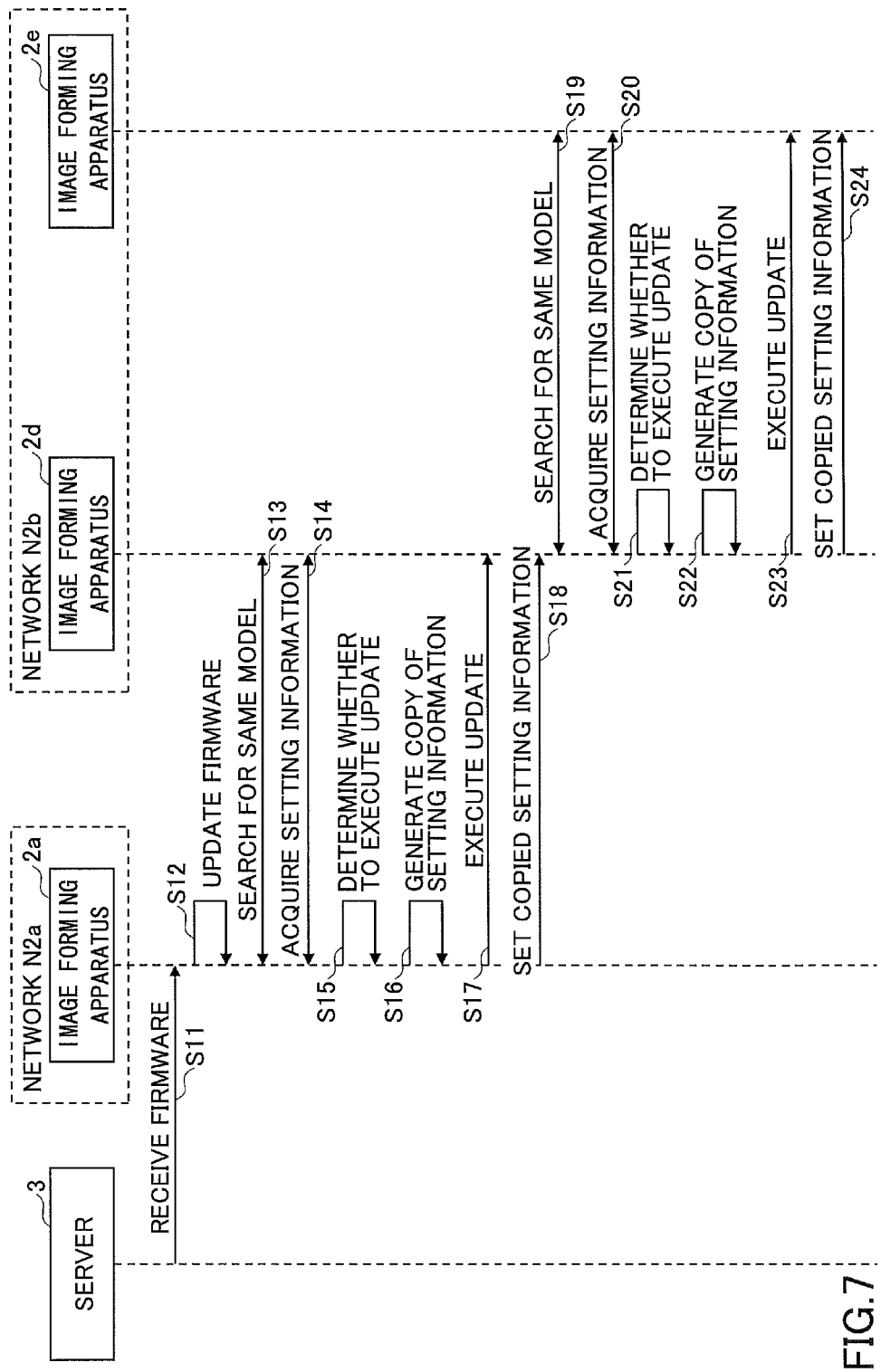
FIG. 7 is a sequence diagram of an example flow of upgrading firmware versions of image forming apparatuses on different network segments according to an embodiment.

FIG. 7 is a sequence diagram illustrating an example process of firmware update performed on the image forming apparatuses 2 (2d, 2e) in a different network segment.

Similar to the above firmware update process in the same segment, the image forming apparatus 2a receives the update request to update the firmware of the own apparatus from the PC (server 3), and performs firmware update (steps S11 and S12). In this case, in the firmware installed in the image forming apparatus 2a, the update execution module 307 is activated.

Next, the image forming apparatus 2a searches for another image forming apparatus(es) 2 which is the same model of the image forming apparatus 2a and which is on the network N (step S13).

Then, the image forming apparatus 2a determines whether the searched-for image forming apparatus 2d belongs to a different network segment, and acquires the setting information of the searched-for image forming apparatus 2d (step S14). Whether the image forming apparatus 2d belongs to a different network segment is determined based on, for example, the IP address acquired while searching for the image forming apparatus 2d.

Based on the acquired setting information, the image forming apparatus 2a determines whether it is necessary for the image forming apparatus 2d to have the firmware updated. When determining that it is necessary to update the firmware, the image forming apparatus 2a designates the image forming apparatus 2d as the image forming apparatus whose firmware is to be updated.

The designation of the image forming apparatus, whose firmware is to be updated, by the image forming apparatus 2a is not limited to the designation of the image forming apparatus 2d. For example, any number of the image forming apparatuses 2 may be designated as the image forming apparatus(es) whose firmware is to be updated (step S15).

Based on the setting items in the own apparatus, the image forming apparatus 2a makes a copy of the setting information of the image forming apparatus 2d, and starts updating the firmware of the designated image forming apparatus 2d (steps S16 and S17).

In this case, the firmware used in the firmware update of the image forming apparatus 2d is the firmware that can be used for the firmware update for an image forming apparatus(es) 2 which is other than the image forming apparatus 2d. In other words, in the firmware, the update execution module 307 is activated.

After the update is completed, based on the copied setting information, the image forming apparatus 2a sets the setting information of the image forming apparatus 2d (step S18).

After the firmware update is completed, the image forming apparatus 2d searches for an image forming apparatus(es) 2e, which is the same model as the image forming apparatus 2d, on the network, and performs the firmware update on the searched for image forming apparatus(es) 2e (steps S19 through S24).

Further, the firmware update performed on the other image forming apparatus by the image forming apparatus 2d is performed by switching on and off (i.e., by activating and deactivating) the update execution module 307 depending on whether the other image forming apparatus belongs to the same network segment as that of the image forming apparatus 2d. Further, the image forming apparatus 2d may register the image forming apparatus 2a that performs the firmware update on the image forming apparatus 2d and the network segment that the image forming apparatus 2a belongs to, so that the firmware update is not performed on the image forming apparatus(es) 2 which belongs to the network segment.

FIG. 8 is a flowchart of a firmware update procedure to be performed on the other image forming apparatus(es) 2. The image forming apparatus 2 starts this procedure after the firmware update to the own apparatus is completed (step S30).

The searching-for section 102 searches for other image forming apparatus(es) 2 that can be connected via the network N (step S31).

The searching-for section 102 determines whether the searched-for image forming apparatus 2 is the same model of the own apparatus (step S32). When determining that the model of the searched-for image forming apparatus 2 is different (NO in step S32), the process ends (step S38).

On the other hand, when it is determined that the model is the same (YES in step S32), the setting information transmission and receiving section 103 acquires the setting information from the searched-for image forming apparatus 2 (step S33).

Based on the acquired setting information, the update execution determination section 104 determines whether the firmware of the searched-for image forming apparatus 2 is to be updated (step S34). When it is determined that it is not necessary to update the firmware of the searched-for image forming apparatus 2 based on the acquired setting information (NO in step S32), the process ends (step S38).

On the other hand, when it is determined that the firmware of the searched-for image forming apparatus 2 is to be updated (YES in step S34), the setting information management section 105 makes a copy of the setting information of the image forming apparatus 2 whose firmware is to be updated (step S35).

After the copy is made, the update execution management section 101 performs firmware update on the image forming apparatus 2 whose firmware is determined to need to be updated (step S36).

After the update is completed, based on the data format of the setting information stored in the own apparatus, the update execution management section 101 sets the copied setting information in the image forming apparatus 2 whose firmware has been updated (step S37).

All or a part of the procedure described above is implemented by a program. The program may be stored in a mobile recording medium. The mobile recording medium herein refers to a non-transitory recording medium.

As an example of the mobile recording medium, there are a magnetic recording medium, an optical disk, a magnetooptical medium, a non-volatile memory, etc. All or a part of the procedure according to an embodiment can be executed by reading the program stored in the mobile recording medium and causing the processor to execute the program.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
   a storage unit configured to receive firmware from an information processing apparatus via a network, and to store the firmware received from the information processing apparatus;
   a search unit configured to search for one or more other image forming apparatuses on the network which are a same model of the image forming apparatus;
   a determination unit configured to determine whether another image forming apparatus on the network with the same model is connected on a same segment of the network with the image forming apparatus or is connected on a different segment of the network with the image forming apparatus; and an update execution management section configured, in response to a determination to update the another image forming apparatus that is connected to the same segment of the network, to send an instruction to the another image forming apparatus to deactivate an ability of the another image forming apparatus of updating the firmware on an additional image forming apparatus on the network;

the update execution management section configured, in response to a determination to update the another image forming apparatus that is connected to the different segment of the network, to send an instruction to the another image forming apparatus to activate the ability of the another image forming apparatus of updating the firmware on the additional image forming apparatus on the network.

2. The image forming apparatus according to claim 1, wherein the search unit is configured to identify the same model on the network of the image forming apparatus based on a unique address assigned to the one or more other image forming apparatuses.

3. The image forming apparatus according to claim 1, further comprising:
a state information acquisition unit configured to acquire state information of the another image forming apparatus;
wherein the determination unit is configured to determine whether to update the another image forming apparatus with the firmware based on the state information.

4. The image forming apparatus according to claim 3, wherein:
in response to a determination to update the another image forming apparatus with the firmware, the update execution management section configured to acquire setting information of the another image forming apparatus, to generate a copy of the setting information in a format corresponding to the firmware updated on the image forming apparatus, and to set the copy with the another image forming apparatus.

5. The image forming apparatus according to claim 1, wherein:
the instruction to the another image forming apparatus to activate the ability causes the another image forming apparatus to:
temporarily activate the ability of the another image forming apparatus for a period of time;
allow the another image forming apparatus to update the additional image forming apparatus on the network during the period of time; and
deactivate the ability of the another image forming apparatus after the period of time.

6. The image forming apparatus according to claim 5, wherein the instruction to the another image forming apparatus to activate the ability enables the another image forming apparatus to update at least one more image forming apparatus that belongs to a same network segment as the another image forming apparatus; and
wherein the same network segment shared between the another image forming apparatus and the at least one more image forming apparatus is a different segment of the network than the image forming apparatus.

7. The image forming apparatus according to claim 1, wherein:
the instruction to the another image forming apparatus to deactivate removes the ability of the another image forming apparatus to perform updates of the firmware for any other image forming apparatus on the network.

8. A method comprising:
receiving firmware from an information processing apparatus to an image forming apparatus via a network;
storing the firmware received from the information processing apparatus;
searching for one or more other image forming apparatuses on the network which are a same model of the image forming apparatus; and
determining whether another image forming apparatus on the network with the same model is connected on a same segment of the network with the image forming apparatus or is connected on a different segment of the network with the image forming apparatus;
in response to a determination to update the another image forming apparatus that is connected to the same segment of the network, sending an instruction to the another image forming apparatus to deactivate an ability of the another image forming apparatus of updating the firmware on an additional image forming apparatus on the network; and
in response to a determination to update the another image forming apparatus that is connected to the different segment of the network, sending an instruction to the another image forming apparatus to activate the ability of the another image forming apparatus of updating the firmware on the additional image forming apparatus on the network.

9. A non-transitory recording medium storing a program causing a computer to execute an image forming method comprising:
receiving firmware from an information processing apparatus to an image forming apparatus via a network;
storing the firmware received from the information processing apparatus;
searching for one or more other image forming apparatuses on the network which are a same model of the image forming apparatus; and
determining whether another image forming apparatus on the network with the same model is connected on a same segment of the network with the image forming apparatus or is connected on a different segment of the network with the image forming apparatus;
in response to a determination to update the another image forming apparatus that is connected to the same segment of the network, sending an instruction to the another image forming apparatus to deactivate an ability of the another image forming apparatus of updating the firmware on an additional image forming apparatus on the network; and
in response to a determination to update the another image forming apparatus that is connected to the different segment of the network, sending an instruction to the another image forming apparatus to activate the ability of the another image forming apparatus of updating the firmware on the additional image forming apparatus on the network.

* * * * *